(12) United States Patent
Park

(10) Patent No.: US 10,415,979 B2
(45) Date of Patent: Sep. 17, 2019

(54) APPARATUS AND METHOD FOR ALERTING PARKING FLOOR

(71) Applicant: HYUNDAI MOTOR COMPANY, Seoul (KR)

(72) Inventor: June Ha Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 215 days.

(21) Appl. No.: 15/366,464

(22) Filed: Dec. 1, 2016

(65) Prior Publication Data
US 2017/0356743 A1    Dec. 14, 2017

(30) Foreign Application Priority Data

Jun. 14, 2016  (KR) .................. 10-2016-0073706

(51) Int. Cl.
*G01C 21/20*    (2006.01)
*G01C 21/00*    (2006.01)

(52) U.S. Cl.
CPC ......... *G01C 21/206* (2013.01); *G01C 21/005* (2013.01)

(58) Field of Classification Search
CPC .......................... G01C 21/206; G01C 21/005
See application file for complete search history.

(56) References Cited

U.S. PATENT DOCUMENTS

| 2001/0041960 | A1* | 11/2001 | Hashida | ................. | G01C 21/20 |
| | | | | | 701/431 |
| 2003/0055556 | A1* | 3/2003 | Hashida | ................. | G01C 21/20 |
| | | | | | 701/408 |
| 2008/0234928 | A1* | 9/2008 | Matsuoka | ............. | G01C 21/20 |
| | | | | | 701/465 |

FOREIGN PATENT DOCUMENTS

| JP | 2001-311623 A | 11/2001 |
| JP | 2007-285733 A | 11/2007 |
| JP | 5223645 B2 | 6/2013 |
| KR | 10-1094153 B1 | 12/2011 |
| KR | 10-2014-0083690 A | 7/2014 |
| KR | 10-2015-0044052 A | 4/2015 |
| KR | 10-2017-0083690 A | 7/2017 |

OTHER PUBLICATIONS

Machine translation of JP 2007-285733 retrieved from Espacenet on Aug. 28, 2018 (Year: 2018).*
Machine translation of KR 10-2014-0083690 retrieved from KIPRIS on Aug. 28, 2018 (Year: 2018).*

* cited by examiner

*Primary Examiner* — Thomas Ingram
(74) *Attorney, Agent, or Firm* — Morgan, Lewis & Bockius LLP

(57) ABSTRACT

An apparatus for alerting a parking floor includes an electronic control unit configured to: determine an entrance of a parking lot; measure a slope of a vehicle; perform wireless communication with an external device through a wireless communication network; determine a current location of the vehicle; determine a gear stage of the vehicle; and compare the slope of the vehicle with a first setup value corresponding to an underground parking lot or a second setup value corresponding to a ground parking lot when the vehicle enters the entrance of the parking lot to determine movement of the vehicle to each floor and determine a parking floor value corresponding to a floor at which the vehicle reaches.

9 Claims, 9 Drawing Sheets

Less than slope of -10°~10° → '0'

(a)

Equal to or less than -10° → '-0.5'

(b)

Equal to or more than 10° → '+0.5'

(c)

APPARATUS AND METHOD FOR ALERTING PARKING FLOOR

CROSS-REFERENCE TO RELATED APPLICATION

This application claims the benefit of priority to Korean Patent Application No. 10-2016-0073706 filed in the Korean Intellectual Property Office on Jun. 14, 2016, the entire content of which is incorporated herein by reference.

TECHNICAL FIELD

The present disclosure relates to an apparatus and a method for alerting a parking floor parked in a building.

BACKGROUND

A building is getting higher and higher due to a limited space and an underground parking lot needs to be dug deeper in order to secure an underground parking lot facility to accommodate vehicles for a lot of people. Recently, new buildings use 10 floors or lower below the ground as a parking lot.

As such, as a parking lot becomes complicated, anyone who drives a vehicle even without distinguishing between men and women of all ages have at least experienced once a situation where he or she does not remember what floor his or her vehicle parked in an apartment, a department store, or a building is parked on. In addition, owners of vehicles who roam a parking lot and go around a parking lot while pressing a remote controller to find out the parked vehicles are often observed.

To solve the above problems of inconvenience, parking location alert services such as a Bluelink Service, a UVO service, or the like have been provided. Such an existing parking location alert service is more effectively used when most of the site is flat and a ground parking lot becomes common, but may have reduced efficiency when there are a lot of buildings and vehicles are parked in, particularly, underground and a skyscraper.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus and a method for alerting a parking floor having advantages of determining what floor a vehicle parked in ground or underground to notify a driver of the parking floor on which the vehicle is parked.

According to an exemplary embodiment in the present disclosure, an apparatus for alerting a parking floor includes a processor configured to: determine an entrance of a parking lot; measure a slope of a vehicle; perform wireless communication with an external device through a wireless communication network; determine a current location of the vehicle; determine a gear stage of the vehicle; and compare the slope of the vehicle with a first setup value corresponding to an underground parking lot or a second setup value corresponding to a ground parking lot when the vehicle enters the entrance of the parking lot so as to determine movement of the vehicle to each floor and determine a parking floor value corresponding to a floor at which the vehicle reaches.

The processor may reflect the parking floor value corresponding to a highest parking floor or a lowest parking floor of the parking lot a parking floor value of a pared floor so as to determine a final parking floor value, and may alert a driver of the final parking floor value.

The processor may further configured to: measure a vehicle speed; and measure a continuous mileage of the vehicle, in which the processor may reset the parking floor value when a current vehicle speed is equal to or greater than a set speed or the mileage is equal to or greater than a set mileage.

The processor may provide current location information to the external device and receive the information on the highest parking floor or the lowest parking floor of the parking lot from the external device.

The processor may set the parking floor value to be '0' when the slope of the vehicle is larger than the first setup value and less than the second setup value, decrease the parking floor value by '−0.5' when the slope of the vehicle is equal to or less than the first setup value, and increase the parking floor value by '0.5' when the slope of the vehicle is equal to or greater than the second setup value and the processor may decrease or increase the parking floor value by '−0.5' or '0.5' in the same direction as a previous decreasing or increasing direction when the slope of the vehicle is larger than the first setup value and less than the second setup value after decreasing or increasing the parking floor value by '−0.5' or '0.5'.

According to another embodiment in the present disclosure, a method for alerting a parking floor includes: determining an entrance of a parking lot; measuring a slope of a vehicle after a vehicle enters the entrance of the parking lot; comparing a slope of a vehicle with a first setup value corresponding to an underground parking lot or a second setup value corresponding to a ground parking lot; decreasing a parking floor value by '−0.5' when the slope of the vehicle is equal to or less than the first setup value and increasing the parking floor value by '0.5' when the slope of the vehicle is equal to or greater than the second setup value; decreasing or increasing the parking floor value by '−0.5' or '0.5' in the same direction as a previous decreasing or increasing direction when the slope of the vehicle is changed to be larger than the first setup value and less than the second setup value after the parking floor value is decreased or increased by '−0.5' or '0.5'; determining a highest parking floor or a lowest parking floor of the corresponding parking lot by providing a current location of the vehicle to an external device; determining a final parking floor value by reflecting the parking floor value corresponding to the highest parking floor or the lowest parking floor to a parking floor value of a parked floor when a gear stage becomes a P range; and alerting a driver of the determined final parking floor value by transmitting the determined final parking floor value to the outside.

The method may further include: resetting the parking floor value when the vehicle speed is equal to or greater than a set speed or a continuous mileage is equal to or greater than a set mileage.

Yet according to another embodiment in the present disclosure, a method for alerting a parking floor includes: determining an entrance of a parking lot; measuring a slope of a vehicle after a vehicle enters the entrance of the parking lot; determining a highest parking floor or a lowest parking floor of the corresponding parking floor by providing a current location of the vehicle to an external device; determining whether a vehicle reaches the highest parking floor or the lowest parking floor by comparing a slope of the vehicle with a first setup value corresponding to an underground parking lot or a second setup value corresponding to a ground parking lot; setting a parking floor value to a parking floor value corresponding to the highest parking floor or the lowest parking floor when the vehicle reaches the highest parking floor or the lowest parking floor; decreasing the parking floor value by '−0.5' when the slope of the vehicle is equal to or less than the first setup value and increasing the parking floor value by '0.5' when the slope of the vehicle is equal to or greater than the second setup value; decreasing or increasing the parking floor value by '−0.5' or '0.5' in the same direction as a previous decreasing or increasing direction when the slope of the vehicle is changed to be larger than the first setup value and less than the second setup value after the parking floor value is decrease or increased by '−0.5' or '0.5'; and alerting a driver of a final parking floor value by transmitting the final parking floor value to the outside.

The method may further include: resetting the parking floor value when the vehicle speed is equal to or greater than a set speed or a continuous mileage is equal to or greater than a set mileage.

According to the exemplary embodiment, when a vehicle is parked in the underground parking lot or the ground parking lot, the parking floor is automatically accurately determined by using the slope of the vehicle and reflecting the parking lot structure of the corresponding building and the driver is notified of the determined parking floor, such that the driver may easily find out the parked vehicle.

DETAILED DESCRIPTION OF THE EMBODIMENTS

Figure 1:
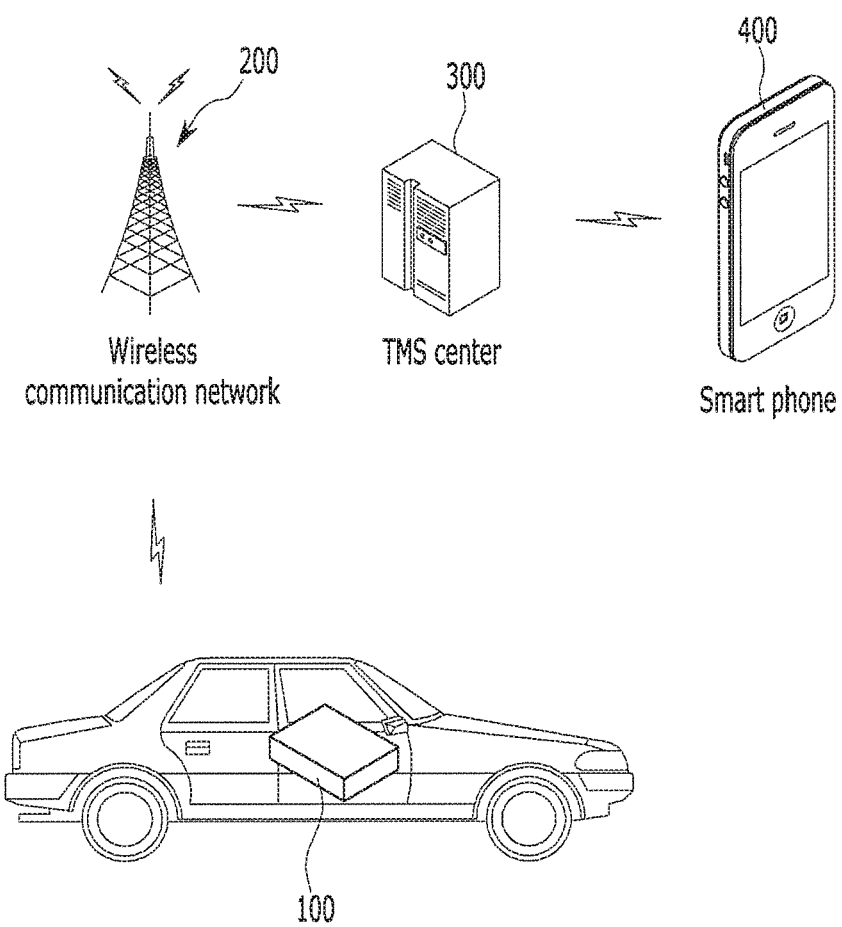
FIG. 1 is a schematic diagram of a network of a system for alerting a parking floor according to one exemplary embodiment in the present disclosure.

Hereinafter, exemplary embodiments so as to be easily practiced by a person skilled in the art to which the present disclosure pertains will be described in detail with reference to the accompanying drawings. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification. In addition, the detailed description of the widely known technologies will be omitted.

In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, an apparatus and a method for alerting a parking floor according to an exemplary embodiment will be described with reference to the accompanying drawings.

FIG. 1 is a schematic diagram of a network of a system for alerting a parking floor according to one exemplary embodiment in the present disclosure. Referring to FIG. 1, a system for alerting a parking floor according to one exemplary embodiment in the present disclosure includes an apparatus 100 for alerting a parking floor mounted in a vehicle, a telematics management system (TMS) center 300 performing data communication with the apparatus 100 for alerting a parking floor through a wireless communication network 200, and a smart phone 400 in which a parking floor alert application is installed.

The apparatus 100 for alerting a parking floor is included in a telematics unit mounted in a vehicle or interworks with the telematics unit. Further, the apparatus 100 for alerting a parking floor may be configured not to interwork with the telematics unit. In this case, the apparatus 100 for alerting a parking floor uses a separate Internet server, not the TMS center 300, and receives information on a parking lot of each building provided from the corresponding Internet server, that is, information on a highest parking floor or a lowest parking floor.

Here, the highest parking floor means a floor at which an underground parking lot first starts when an underground floor of a building is used as a parking lot. For example, when floors one through three below the ground in the underground floor are used as living facilities such as restaurant and supermarket and floors four through eight below the ground are used as a parking lot, the highest parking floor becomes a fourth floor below the ground. The lowest parking floor means a floor at which the ground parking lot first starts when a ground floor of a building is used as a parking lot. For example, when floors one through three above the ground in the ground floor are used as living facilities such as restaurant and supermarket and floors four through eight above the ground are used a parking lot, the lowest parking floor becomes a fourth floor above the ground.

The TMS center 300 performs data communication with the apparatus 100 for alerting a parking floor to transmit the highest parking floor or the lowest parking floor of a building that a vehicle enters to the apparatus 100 for alerting a parking floor.

The smart phone 400 may perform wireless data communication and is collectively referred to as all kinds of portable electronic devices and includes a parking floor alert application for receiving parking floor alert information.

Figure 2:
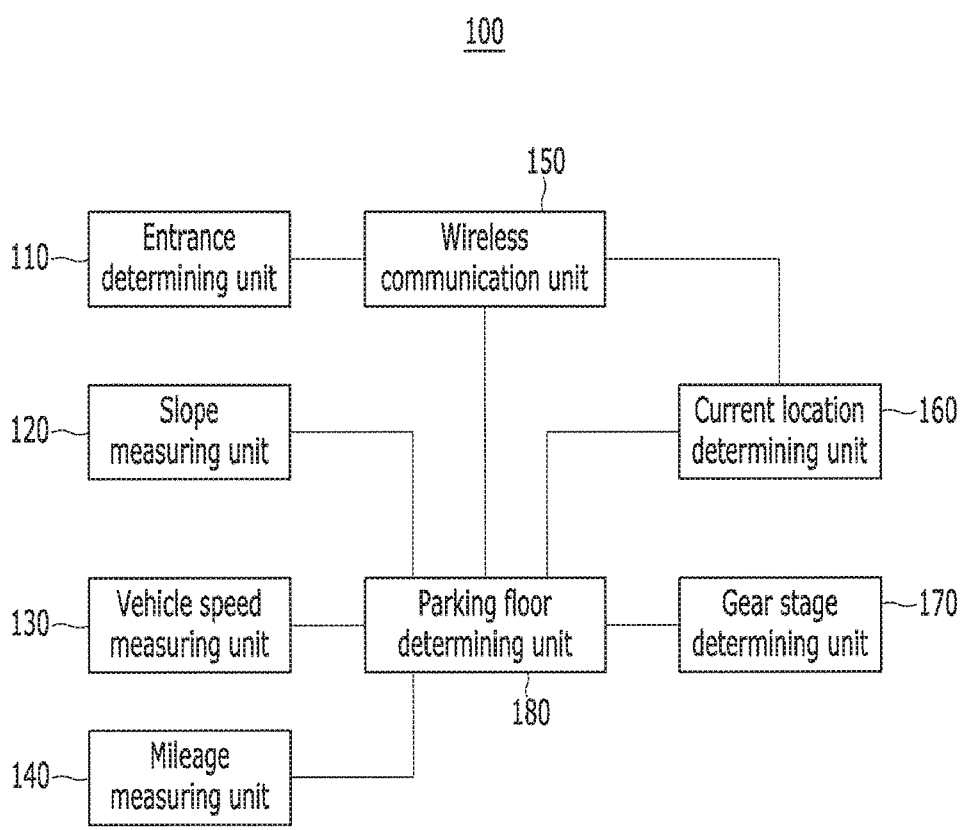
FIG. 2 is a block diagram of an apparatus for alerting a parking floor according to one exemplary embodiment in the present disclosure.

Hereinafter, the apparatus for alerting a parking floor according to one exemplary embodiment in the present disclosure will be described. FIG. 2 is a block diagram of an apparatus for alerting a parking floor according to one exemplary embodiment in the present disclosure.

Referring to FIG. 2, the apparatus 100 for alerting a parking floor according to the present disclosure includes an entrance determining unit 110, a slope measuring unit 120, a vehicle speed measuring unit 130, a mileage measuring unit 140, a wireless communication unit 150, a current location determining unit 160, a gear stage determining unit 170, and a parking floor determining unit 180. The entrance determining unit 110, the slope measuring unit 120, the vehicle speed measuring unit 130, the mileage measuring unit 140, the wireless communication unit 150, the current location determining unit 160, the gear stage determining unit 170, and the parking floor determining unit 180 may be configured as a hardware processor with software having instructions which cause the hardware processor to perform the functions of the above units.

The entrance determining unit 110 communicates with a communication device (not illustrated) installed at an entrance of a parking lot to determine the entrance of the parking lot or uses the current location determining unit 160 and the wireless communication unit 140 to inquire the TMS center 300 whether the current location is the entrance of the parking lot and determine the entrance of the parking lot based on a response to the inquiry from the TMS center 300.

The slope measuring unit 120 may include a gyro sensor or a slope sensor and measures a slope of a vehicle, that is, a slope of a road. The vehicle speed measuring unit 130 measures the vehicle speed and the mileage measuring unit 140 measures a continuous mileage of a vehicle.

The wireless communication unit 150 may perform wireless communication with the TMS center 300 through the wireless communication network 200. The current location determining unit 160 determines a current location of a vehicle and may be an apparatus that uses, for example, a GPS to determine the current location.

The gear stage determining unit 170 determines a gear stage of a vehicle. For example, the gear stage determining unit 170 determines whether a current gear stage is a drive range (i.e., D range), a neutral range (i.e., N range), and a parking range (i.e., P range).

The parking floor determining unit 180 is operated when a vehicle enters the entrance of the parking lot through the entrance determining unit 110 and uses information on the highest (or lowest) parking floor of the corresponding parking lot received from the slope measuring unit 120, the vehicle speed measuring unit 130, the mileage measuring unit 140, the gear stage determining unit 170, and the TMS center 300 to determine a parking floor.

When a parking floor value (level of vehicle; LOV) is manually reset, the apparatus 100 for alerting a parking floor according to the present disclosure may exclude the vehicle speed measuring unit 130 and the mileage measuring unit 140.

Hereinafter, an operation of determining, by the parking floor determining unit 180, the parking floor value will be described with reference to FIGS. 3 to 7.

Figure 3:
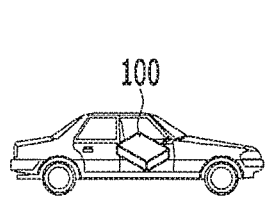
FIG. 3 is a diagram for describing a method for determining a parking floor value depending on a slope according to one exemplary embodiment in the present disclosure.
Figure 3:
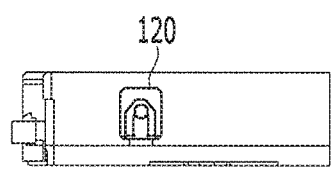
Figure 3:
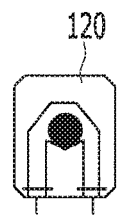
Figure 3:
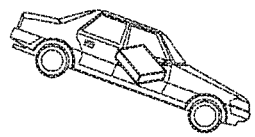
Figure 3:
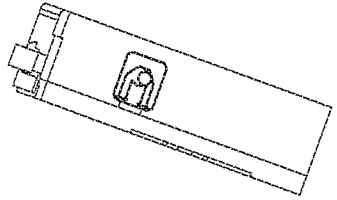
Figure 3:
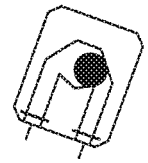
Figure 3:
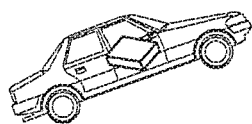
Figure 3:
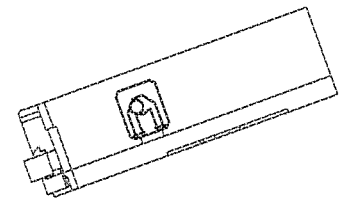
Figure 3:
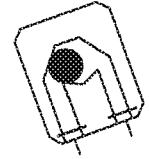

First, the operation of determining, by the parking floor determining unit 180, the parking floor value using the slope measuring unit 120 will be described with reference to FIG. 3. FIG. 3 is a diagram for describing a method for determining a parking floor value depending on a slope according to the present disclosure.

Referring to FIG. 3B, the parking floor determining unit 180 adds −0.5 to the parking floor value when the slope of the vehicle (i.e., slope of a road) determined based on the output of the slope measuring unit 120 is equal to or less than −10° after a vehicle enters the entrance of the parking lot. That is, the parking floor value is set to be (parking floor value −0.5) (LOV −0.5). Here, the parking floor value of (−) means an underground floor and a unit of −0.5 means an intermediate floor between floors.

Referring to FIG. 3C, the parking floor determining unit 180 adds 0.5 to the parking floor value when the slope of the vehicle determined based on the output of the slope measuring unit 120 is equal to or greater than 10° after a vehicle enters the entrance of the parking lot. That is, the parking floor value is set to be (parking floor value +0.5) (LOV +0.5). Here, the parking floor value of (+) means a ground floor and a unit of +0.5 means an intermediate floor between floors.

Referring to FIG. 3A, the parking floor determining unit 180 determines the parking floor value as '0' when the slope of the vehicle determined based on the output of the slope measuring unit 120 is larger than −10° and less than 10° after a vehicle enters the entrance of the parking lot. However, if the just previous slope of the vehicle is equal to or less than −10° or is equal to or greater than 10°, the same parking floor value (i.e., −0.5 or +0.5) as the just previous slope is added even though the slope of the vehicle is larger than −100 and less than 10°.

According to the foregoing exemplary embodiment, the slope of the vehicle sets −10° as a setup value for downhill and sets 10° as a setup value for uphill, but the present disclosure is not limited thereto. Therefore, each setup value may be set to be values other than −10° and 10°. The setup value may be changed depending on an area, a country, or the like and may be changed depending on regulations about a parking lot facility.

Figure 4:
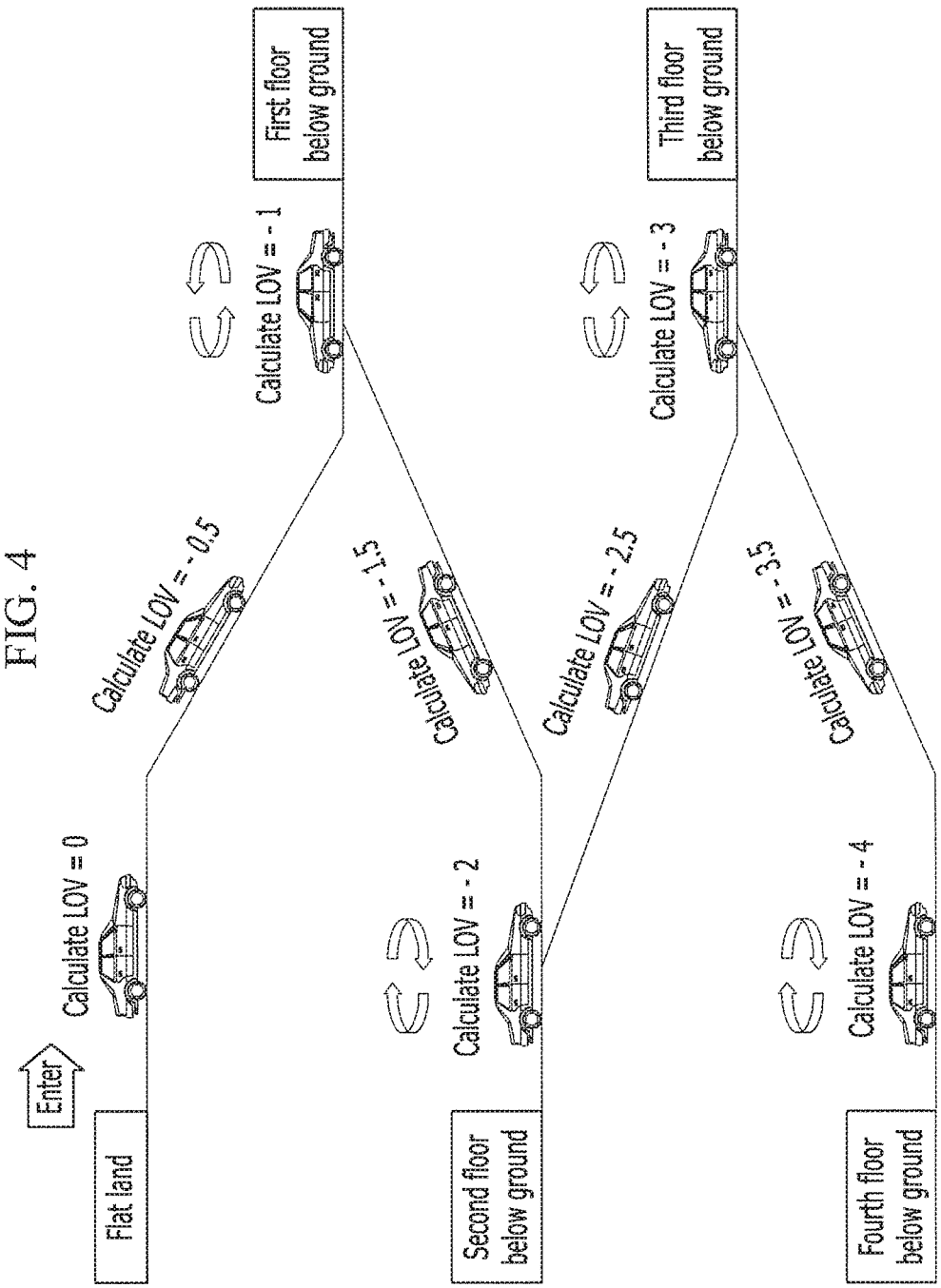
FIG. 4 is a diagram for describing a method for determining a parking floor value for an underground parking floor according to one exemplary embodiment in the present disclosure.
Figure 5:
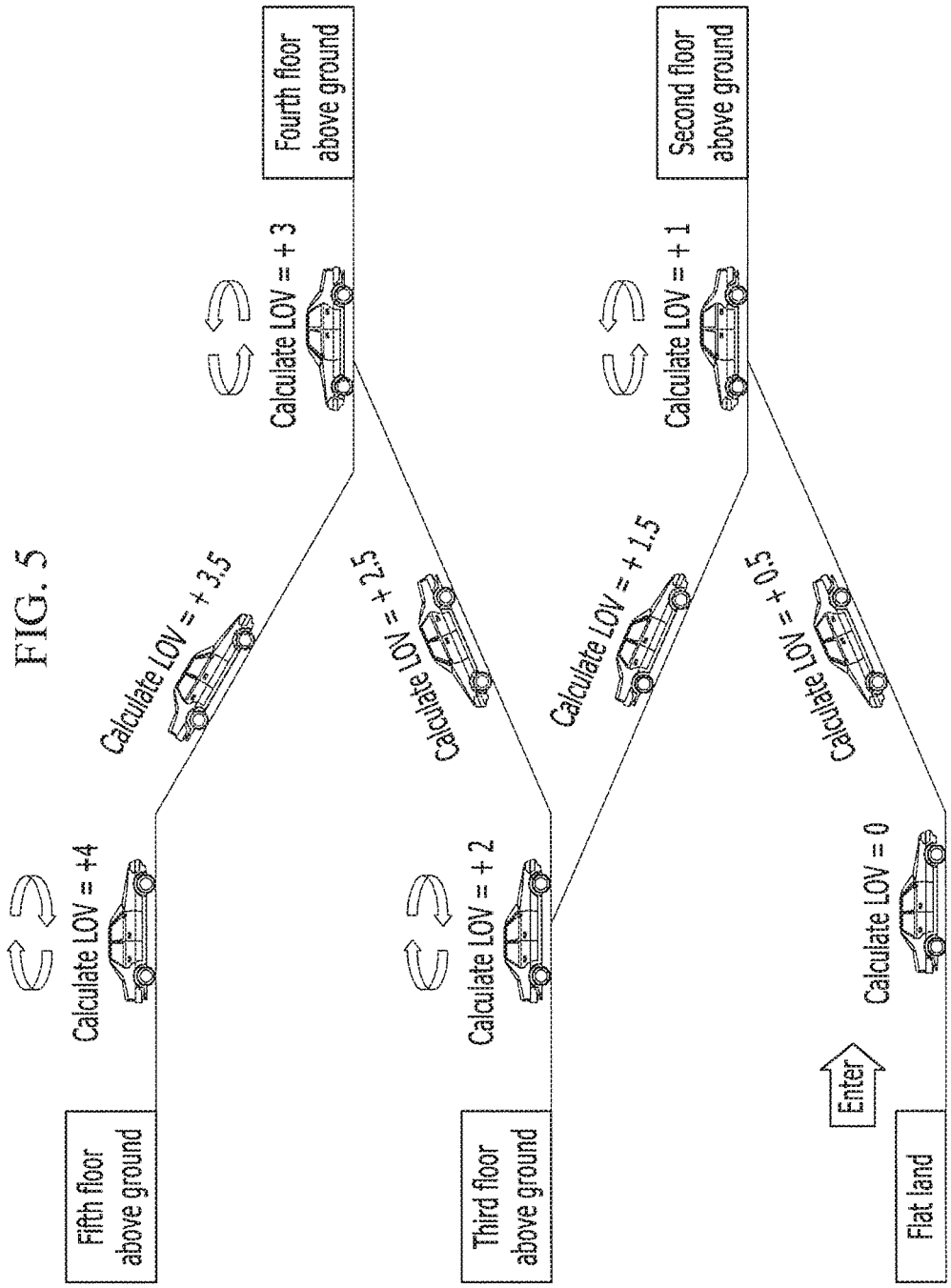
FIG. 5 is a diagram for describing a method for determining a parking floor value for a ground parking floor according to one exemplary embodiment in the present disclosure.

The example thereof will be described with reference to FIGS. 4 and 5. FIG. 4 is a diagram for describing a method for determining a parking floor value for an underground parking lot according to one exemplary embodiment in the present disclosure and FIG. 5 is a diagram for describing a method for determining a parking floor value for a ground parking lot according to one exemplary embodiment in the present disclosure.

Referring to FIG. 4, when a vehicle enters an underground parking lot from a flat land and then travels downhill to enter a first floor below the ground, the parking floor determining unit 180 determines that the slope of the vehicle is equal to or less than −10° based on the output of the slope measuring unit 120 and determines that the parking floor value is −0.5 (LOV=−0.5). Further, when a vehicle reaches a first floor below the ground passing through downhill, the parking floor determining unit 180 determines that the slope of the vehicle is larger than −10° and less than 100 to add −0.5 to the parking floor value, thereby determining the parking floor value is −1 (LOV=−1).

When a vehicle travels downhill between a first floor and a second floor below the ground, the parking floor determining unit 180 determines that the slope of the vehicle is equal to or less than −10° to add −0.5 to the parking floor value, thereby determining the parking floor value is −1.5

(LOV=−1.5) and when a vehicle reaches a second floor below the ground, determines that the slope of the vehicle is larger than −10° and less than 10° to add −0.5 to the parking floor value, thereby determining the parking floor value is −2.0 (LOV=−2.0). Based on the above principle, the parking floor determining unit 180 determines that the parking floor value is −2.5 (LOV=−2.5) for the downhill between a second floor and a third floor below the ground, determines that the parking floor value is −3.0 (LOV=−3.0) a third floor below the ground, and determines that the parking floor value is −4.0 (LOV=−4.0) when a vehicle reaches a fourth floor below the ground. Therefore, when a vehicle is parked at (LOV=−4), the parking floor determining unit 180 determines the parking floor as a fourth floor below the ground.

Referring to FIG. 5, when a vehicle enters a ground parking lot from a flat land and then travels uphill to enter a second floor above the ground, the parking floor determining unit 180 determines that the slope of the vehicle is equal to or greater than 10° based on the output of the slope measuring unit 120 and determines that the parking floor value is 0.5 (LOV=0.5). Further, when a vehicle reaches a second floor above the ground passing through uphill, the parking floor determining unit 180 determines that the slope of the vehicle is larger than −10° and less than 10° to add 0.5 to the parking floor value, thereby determining the parking floor value is 1 (LOV=1).

When a vehicle travels uphill between a second floor and a third floor above the ground, the parking floor determining unit 180 determines that the slope of the vehicle is equal to or greater than 10° to add +0.5 to the parking floor value, thereby determining the parking floor value is 1.5 (LOV=1.5) and when a vehicle reaches a third floor above the ground, determines that the slope of the vehicle is larger than −10° and less than 10° to add +0.5 to the parking floor value, thereby determining the parking floor value is 2.0 (LOV=2.0). Based on the above principle, the parking floor determining unit 180 determines that the parking floor value is 2.5 (LOV=2.5) for the uphill between a third floor and a fourth floor above the ground, determines that the parking floor value is 3.0 (LOV=3.0) for a fourth floor above the ground, and determines that the parking floor value is 4.0 (LOV=4.0) when a vehicle reaches a fifth floor above the ground.

Therefore, in the case of the ground parking lot, the parking floor determining unit 180 adds "1" to the parking floor value upon the determination of the final parking floor value to determine the parking floor. Therefore, when a vehicle is parked at (LOV=4), the parking floor determining unit 180 determines the paring floor value (LOV=4+1) to finally determine a parking floor as a fifth floor above the ground.

By the way, the ground parking lot or the underground parking lot of each building may use some of the underground floor or some of the ground floor as a separate use, and therefore a floor at which a parking lot first starts may be a second floor, a third floor, a fourth floor, or the like below the ground or a third floor, a fourth floor, a fifth floor, or the like above the ground.

To cope with the case in which floors at which parking lots of each building start are different, the parking floor determining unit 180 is linked with the TMS center 300, thereby solving the problem. The description thereof will be described with reference to FIGS. 6 and 7.

The apparatus 100 for alerting a parking floor alerts a current location to the TMS center 300 when the vehicle enters the entrance of the parking lot. Next, the TMS center 300 checks a building that a vehicle enters and parking lot information of the corresponding building and determines the highest parking floor or the lowest parking floor of the corresponding building. Further, the TMS center 300 provides the determined highest parking floor or lowest parking floor of the corresponding building to the apparatus 100 for alerting a parking floor and the parking floor determining unit 180 of the apparatus 100 uses the parking floor or the lowest parking floor to determine the final parking floor.

Figure 6:
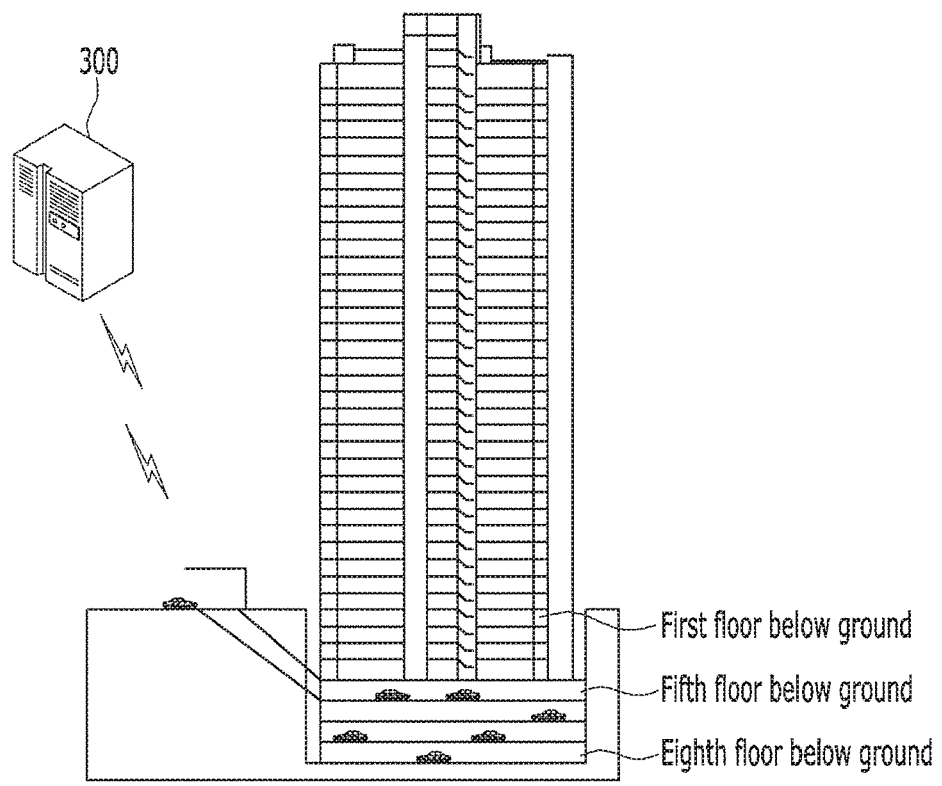
FIG. 6 is a diagram for describing a method for determining a final parking floor for an underground parking lot of a building according to one exemplary embodiment in the present disclosure.

The example thereof will be described with reference to FIG. 6. FIG. 6 is a diagram for describing a method for determining a final parking floor for an underground parking floor of a building according to one exemplary embodiment in the present disclosure. Referring to FIG. 6, the apparatus 100 for alerting a parking floor determines GPS location information using the current location determining unit 160 when (before) a vehicle enters an entrance of a parking lot and provides the determined GPS location information to the TMS center 300 to inquire the highest parking floor or the lowest parking floor.

Therefore, the TMS center 300 identifies a building that a vehicle enters using the GPS location information and determines that a parking lot is an underground parking lot and the highest parking lot is a fifth floor below the ground using stored parking lot information corresponding to the identified building. Further, the TMS center 300 alerts the apparatus 100 for alerting a parking lot that the highest parking floor is a fifth floor below the ground.

When the parking floor determining unit 180 determines that the highest parking floor of an underground parking lot of a building in which a vehicle will be parked is a fifth floor below the underground from the TMS center 300, the parking floor determining unit 180 reflects the information on the highest parking floor to the parking floor value to determine the parking floor.

For example, when a vehicle is parked on an eighth floor below the ground, the parking floor determining unit 180 determines the parking floor value as described with reference to FIG. 4, and determines that the parking floor value is −4 (LOV=−4) when a vehicle is parked on the eighth floor below the ground. Next, the parking floor determining unit 180 reflects '−5' that is the parking floor value corresponding to the highest parking floor (i.e., a fifth floor below the ground) to the parking floor value and adds +1 that is an offset value. That is, the parking floor determining unit 180 reflects the parking floor value of the highest parking floor and the offset value to determine the parking floor value (LOV=−8) that is (LOV=−4−5+1).

As another example, the parking floor determining unit 180 determines the parking floor value in a manner that an underground floor when a vehicle first reaches from a flat land, that is, an underground floor that is determined to be LOV=−1 is determined as the highest parking floor to set (LOV=−5) and then −0.5 is added for downhill until a vehicle reaches an eighth floor below the ground and −0.5 is again added at a floor at which the slope of the vehicle is larger than −10° and less than 10°, thereby finally determining the parking floor value is −8 (LOV=−8) when a vehicle reaches the eighth floor below the ground.

Figure 7:
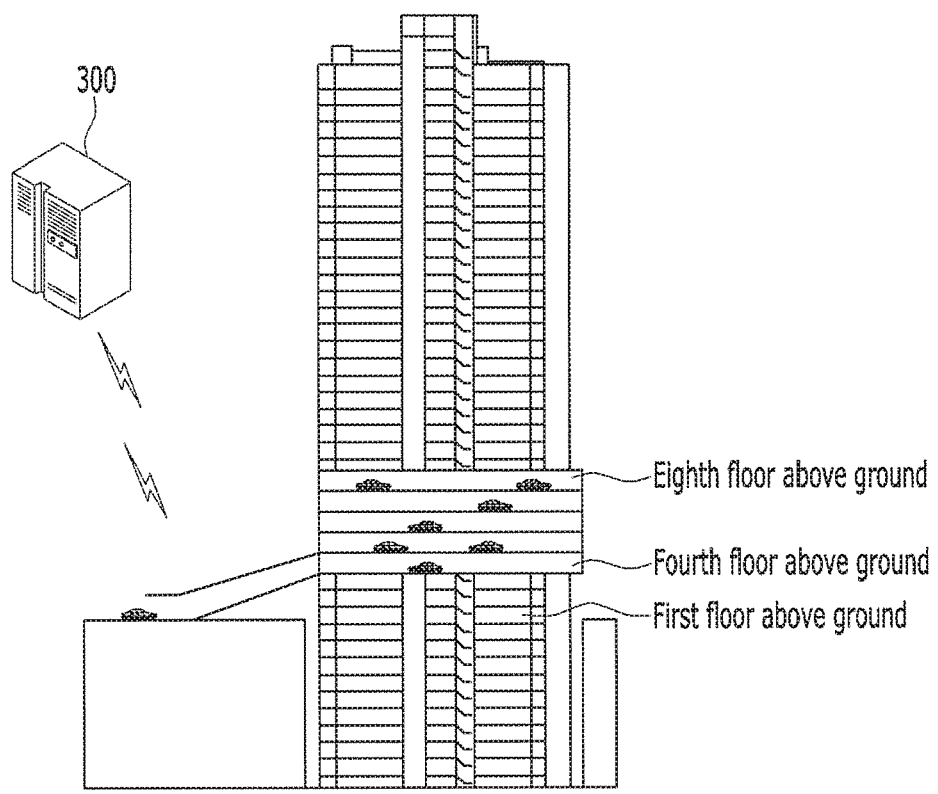
FIG. 7 is a diagram for describing a method for determining a final parking floor for a ground parking lot of a building according to one exemplary embodiment in the present disclosure.

Another example of determining a parking floor using the TMS center 300 will be described with reference to FIG. 7. FIG. 7 is a diagram for describing a method for determining a final parking floor for a ground parking floor of a building according to one exemplary embodiment in the present disclosure. Referring to FIG. 7, the apparatus 100 for alerting a parking floor determines GPS location information using the current location determining unit 160 when (before) a vehicle enters an entrance of a parking lot and provides the determined GPS location information to the TMS center 300 to inquire the highest parking floor or the lowest parking floor.

Therefore, the TMS center 300 identifies a building that a vehicle enters using the GPS location information and determines that a parking lot is a ground parking lot and the lowest parking lot is a fourth floor below the ground using stored parking lot information corresponding to the identified building. Further, the TMS center 300 alerts the apparatus 100 for alerting a parking floor that the lowest parking floor is a fourth floor above the ground. When the parking floor determining unit 180 of the apparatus 100 for alerting a parking floor determines that the lowest parking floor of an underground parking lot of a building in which a vehicle will be parked is a fourth floor above the ground from the TMS center 300, the parking floor determining unit 180 reflects the information on the lowest parking floor to the parking floor value to determine the parking floor.

For example, when a vehicle is parked on an eighth floor above the ground, the parking floor determining unit 180 determines the parking floor value as described with reference to FIG. 5, and determines that the parking floor value is +6 (LOV=+6) when a vehicle is parked on the eighth floor above the ground. Next, the parking floor determining unit 180 reflects '+4' that is the parking floor value corresponding to the highest parking floor (i.e., a fourth floor above the ground) to the parking floor value and adds −2 that is an offset value. That is, the parking floor determining unit 180 reflects the parking floor value of the highest parking floor and the offset value to determine the parking floor value (LOV=8) that is (LOV=6+4+−2).

As another example, the parking floor determining unit 180 determines the parking floor value in a manner that a ground floor that a vehicle first reaches from a flat land, that is, a ground floor that is determined to be LOV=1 is determined as the lowest parking floor to set (LOV=4) and then 0.5 is added for uphill until a vehicle reaches an eighth floor above the ground and 0.5 is again added at a floor at which the slope of the vehicle is larger than −10° and less than 10°, thereby finally determining the parking floor value is 8 (LOV=8) when a vehicle reaches the eighth floor above the ground.

Hereinafter, a method for alerting a parking floor will be described with reference to FIGS. 8 and 9.

Figure 8:
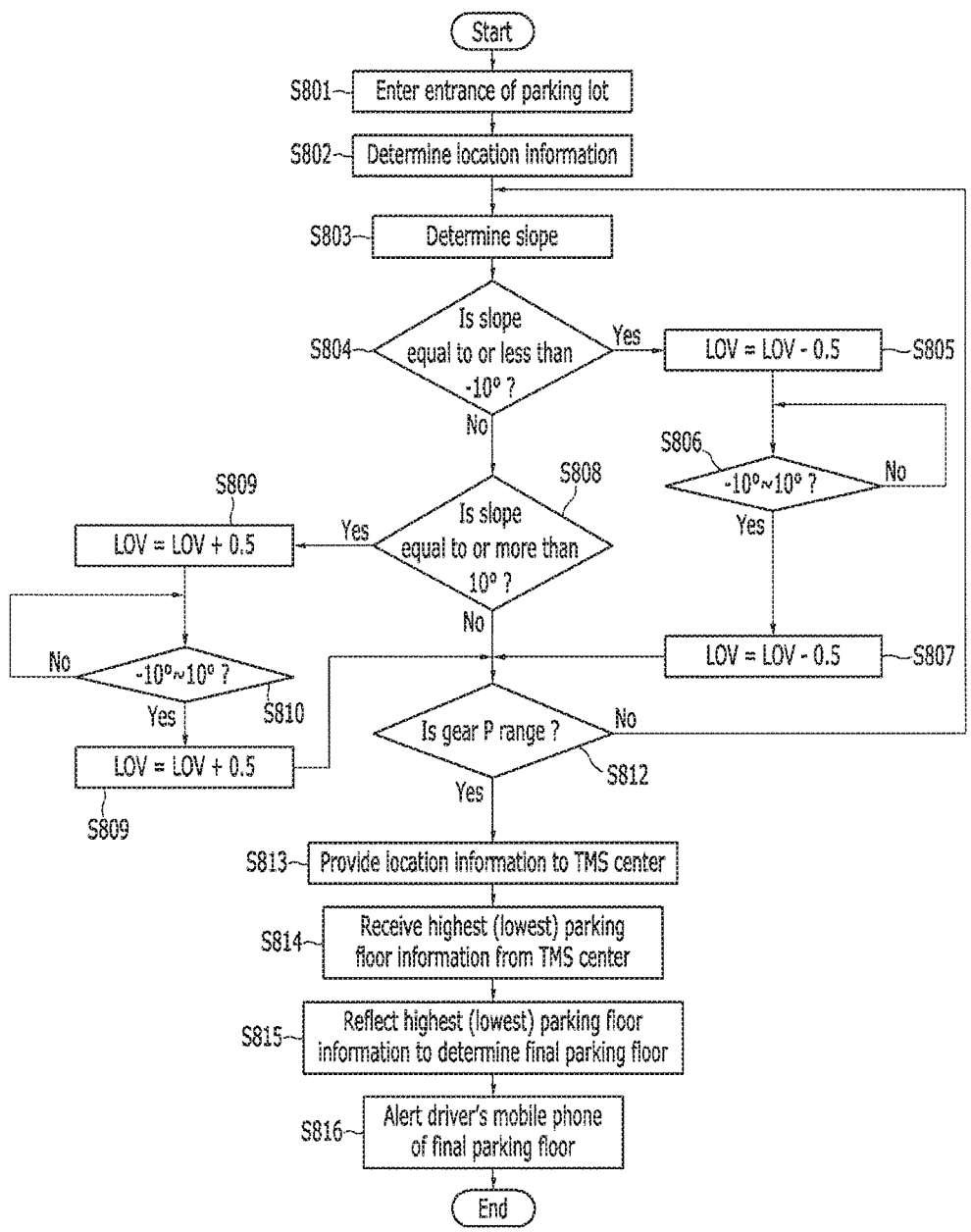
FIG. 8 is a flowchart illustrating a method of alerting a parking floor according to one exemplary embodiment in the present disclosure.

FIG. 8 is a flowchart illustrating a method of alerting a parking floor according to one exemplary embodiment in the present disclosure. Referring to FIG. 8, if the parking floor determining unit 180 determines that a vehicle enters an entrance of a parking lot or before a vehicle enters an entrance of a parking lot using the entrance determining unit 110 (S801), the parking floor determining unit 180 determines and stores the GPS location information using the current location determining unit 160 (S802).

Further, the parking floor determining unit 180 determines the slope of the vehicle (i.e., slope of a road) changed according to the movement of the vehicle to each floor of the underground parking lot or each floor of the ground parking lot using the slope measuring unit 120 (S803).

If the slope of the vehicle is equal to or less than −10° (S804), the parking floor determining unit 180 decreases the parking floor value by −0.5 (S805) and then if the slope of the vehicle is changed to be larger than −10° and less than 10° (S806), the parking floor determining unit 180 again decreases the LOV value by −0.5 (S807). Further, the parking floor determining unit 180 repeats processes S804 to S807 before the gear stage becomes the P range for the underground parking lot (before the ignition off) to determine the parking floor value.

Alternatively, if the slope of the vehicle is equal to or greater than 10° (S808), the parking floor determining unit 180 increases the parking floor value by 0.5 (S809) and then if the slope of the vehicle is changed to be larger than −10° and less than 10° (S810), the parking floor determining unit 180 again increases the parking floor value by 0.5 (S811). Further, the parking floor determining unit 180 repeats processes 8809 to S811 before the gear stage becomes the P range at the underground parking lot (before the ignition off) to determine the parking floor value.

When the parking floor determining unit 180 determines that the gear stage is the P range using the gear stage determining unit 170 (S812), the parking floor determining unit 180 provides the stored GPS location information to the TMS center 300 (S813) and receives and determines the information on the highest parking floor or the lowest parking floor of the corresponding building from the TMS center 300 (S814).

Next, the parking floor determining unit 180 reflects the parking floor value and the offset value that correspond to the highest parking floor (or lowest parking floor) to the parking floor value determined before the gear stage becomes the P range to determine the final parking floor value (S815).

Further, the parking floor determining unit 180 provides the determined information on the final parking floor value to the TMS center 300 through the wireless communication network 200 and the TMS center 300 provides the information on the final parking floor value (i.e., information on the parking floor) to the smart phone 400 of the driver (S816).

The foregoing exemplary embodiment in the present disclosure describes that after the gear stage is the P range, the location information is transmitted to the TMS center 300 to determine the highest parking floor (or lowest parking floor), but another example may be performed before the parking floor value is determined.

Further, the foregoing one example describes that the parking floor value corresponding to the highest parking floor (or lowest parking floor) is reflected to the parking floor value after the process S812, but another example may reflect the parking floor value of a floor that a vehicle first reaches as the parking floor value corresponding to the highest parking floor (or lowest parking floor).

Figure 9:
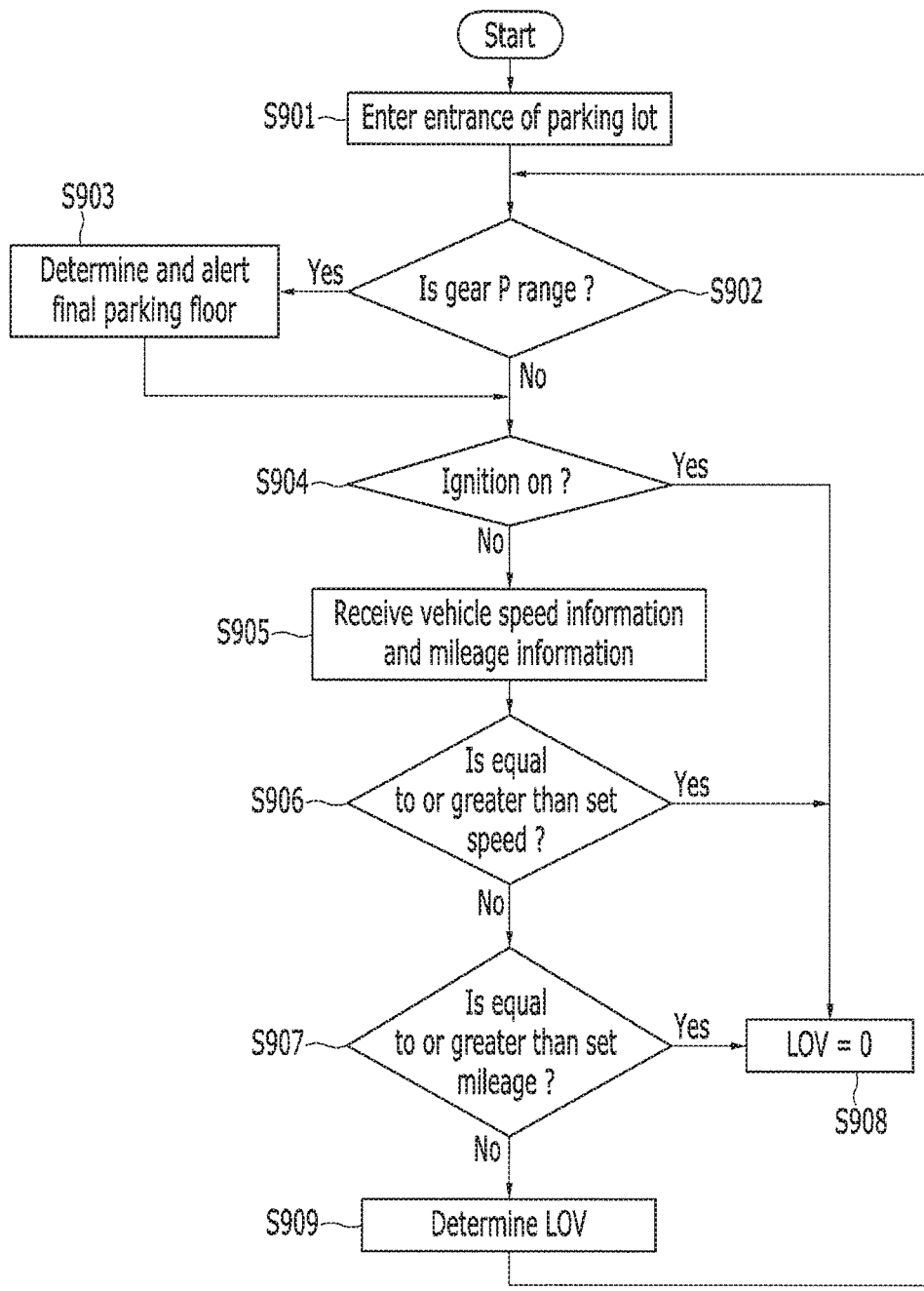
FIG. 9 is a flowchart of a parking floor value reset method according to one exemplary embodiment in the present disclosure.

FIG. 9 is a flow chart of a parking floor value reset method according to one exemplary embodiment in the present disclosure. The parking floor value reset method described with reference to FIG. 9 is a method for automatically resetting the parking floor value to be (LOV=0).

Referring to FIG. 9, when the parking floor determining unit 180 determines that a vehicle enters an entrance of a parking lot or before a vehicle enters an entrance of a parking lot (S901), the parking floor determining unit 180 determines the parking floor value (S909) and when the gear stage becomes the P range (S902), determines the final parking floor value and alerts the driver of the final parking floor (S903).

When the parking floor determining unit 180 determines that after a vehicle enters an entrance of a parking lot, the gear stage is not the P range (S902) or when the vehicle is ignited on, that is, starts (S904), the parking floor determining unit 180 determines whether to reset the parking floor value.

To determine whether to reset the parking floor value, the parking floor determining unit 180 receives the vehicle speed information and the mileage information from the vehicle speed measuring unit 130 and the mileage measuring unit 140 (S905) and when the vehicle speed is equal to or greater than a set speed (for example; 30 Km/h, 40 Km/h, or the like) (S906) or a mileage is equal to or greater than the set mileage (for example; 2 Km, 3 Km, or the like) (S907), determines that a vehicle is out of a parking lot or a driver does not have the will to park a vehicle to reset the parking floor value to be '0' (S908).

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An apparatus for alerting a parking floor, the apparatus comprising a processor configured to:
   determine an entrance of a parking lot;
   measure a slope of a vehicle;
   perform wireless communication with an internet server through a wireless communication network;
   determine a current location of the vehicle;
   determine a gear stage of the vehicle;
   compare the slope of the vehicle with a first setup value corresponding to an underground parking lot or a second setup value corresponding to a ground parking lot when the vehicle enters the entrance of the parking lot to determine movement of the vehicle to each floor and to determine a parking floor value corresponding to a floor at which the vehicle reaches;
   reflect the parking floor value corresponding to a highest parking floor or a lowest parking floor of the parking lot to a parking floor value at which the vehicle is parked to determine a final parking floor value;
   alert a portable electronic device of a driver of the final parking floor value;
   measure a vehicle speed;
   measure a continuous mileage of the vehicle; and
   reset the parking floor value when the vehicle speed is equal to or greater than a set speed or the mileage is equal to or greater than a set mileage.

2. The apparatus of claim 1, wherein the processor is further configured to:
   provide current location information to the internet server; and
   receive the information on the highest parking floor or the lowest parking floor of the parking lot from the internet server.

3. The apparatus of claim 1, wherein the processor is further configured to:
   set the parking floor value to be 0 when the slope of the vehicle is larger than the first setup value and less than the second setup value;
   decrease the parking floor value by −0.5 when the slope of the vehicle is equal to or less than the first setup value;
   increase the parking floor value by 0.5 when the slope of the vehicle is equal to or greater than the second setup value; and
   decrease the parking floor value by −0.5 in the same direction as a previous decreasing direction when the slope of the vehicle is larger than the first setup value and less than the second setup value after decreasing the parking floor value by −0.5.

4. The apparatus of claim 1, wherein the processor is further configured to increase the parking floor value by 0.5 in the same direction as a previous increasing direction when the slope of the vehicle is larger than the first setup value and less than the second setup value after increasing the parking floor value by −0.5 or 0.5.

5. A method for alerting a parking floor, comprising:
   determining, by a processor, an entrance of a parking lot;
   measuring, by the processor, a slope of a vehicle after the vehicle enters the entrance of the parking lot;
   comparing, by the processor, the slope of the vehicle with a first setup value corresponding to a underground parking lot, or with a second setup value corresponding to a ground parking lot;
   decreasing, by the processor, a parking floor value by −0.5 when the slope of the vehicle is equal to or less than the first setup value and increasing the parking floor value by 0.5 when the slope of the vehicle is equal to or greater than the second setup value;
   decreasing, by the processor, the parking floor value by −0.5 in the same direction as a previous decreasing direction when the slope of the vehicle is changed to be larger than the first setup value and less than the second setup value after the parking floor value is decreased by −0.5;
   determining, by the processor, a highest parking floor or a lowest parking floor of the corresponding parking lot by providing a current location of the vehicle to an internet server;
   determining, by the processor, a final parking floor value by reflecting the parking floor value corresponding to the highest parking floor or the lowest parking floor to a parking floor value of a parked floor when a gear stage becomes a parking (P) range; and
   alerting, by the processor, a portable electronic device of a driver of the determined final parking floor value by transmitting the determined final parking floor value to an outside.

6. The method of claim 5, the processor increases the parking floor value by 0.5 in the same direction as a previous increasing direction when the slope of the vehicle is changed to be larger than the first setup value and less than the second setup value after the parking floor value is increased by 0.5.

7. The method of claim 5, further comprising resetting, by the processor, the parking floor value when a vehicle speed is equal to or greater than a set speed or a continuous mileage is equal to or greater than a set mileage.

8. A method for alerting a parking floor, comprising:
   determining, by a processor, an entrance of a parking lot;
   measuring, by the processor, a slope of a vehicle after the vehicle enters the entrance of the parking lot;
   determining, by the processor, a highest parking floor or a lowest parking floor of the corresponding parking floor by providing a current location of the vehicle to an internet server;
   determining, by the processor, whether the vehicle reaches the highest parking floor or the lowest parking floor by comparing the slope of the vehicle with a first setup value corresponding to an underground parking lot or a second setup value corresponding to a ground parking lot;
   setting, by the processor, a parking floor value to corresponds to the highest parking floor or the lowest parking floor when the vehicle reaches the highest parking floor or the lowest parking floor, respectively;
   decreasing, by the processor, the parking floor value by −0.5 when the slope of the vehicle is equal to or less than the first setup value and increasing the parking floor value by 0.5 when the slope of the vehicle is equal to or greater than the second setup value;

decreasing or increasing, by the processor, the parking floor value by −0.5 or 0.5 in the same direction as a previous decreasing or increasing direction when the slope of the vehicle is changed to be larger than the first setup value and less than the second setup value after the parking floor value is decreased or increased by −0.5 or 0.5; and alerting, by the processor, a portable electronic device of a driver of a final parking floor value by transmitting the final parking floor value to the outside when a gear stage becomes a parking (P) range.

9. The method of claim 8, further comprising resetting, by the processor, the parking floor value when a vehicle speed is equal to or greater than a set speed or a continuous mileage is equal to or greater than a set mileage.

* * * * *